(12) United States Patent
Spichale

(10) Patent No.: US 7,106,793 B2
(45) Date of Patent: Sep. 12, 2006

(54) METHOD, DEVICE, AND INTERFACE FOR TRANSMITTING DATA

(75) Inventor: Thomas Spichale, Schoenbrunn (DE)

(73) Assignee: Robert Bosch GmbH, Stuttgart (DE)

( * ) Notice: Subject to any disclaimer, the term of this patent is extended or adjusted under 35 U.S.C. 154(b) by 698 days.

(21) Appl. No.: 09/965,779

(22) Filed: Sep. 27, 2001

(65) Prior Publication Data
US 2002/0071484 A1 Jun. 13, 2002

(30) Foreign Application Priority Data
Sep. 27, 2000 (DE) ................................ 100 49 090

(51) Int. Cl.
H03K 7/08 (2006.01)
H03K 9/08 (2006.01)
(52) U.S. Cl. ...................... 375/238; 375/286; 370/464; 714/800
(58) Field of Classification Search ................ 375/238, 375/286; 340/5, 62; 348/14.12; 370/212, 370/464; 379/9.06; 332/109; 714/800; 329/312
See application file for complete search history.

(56) References Cited

U.S. PATENT DOCUMENTS

| 4,731,781 A | * | 3/1988 | Nakamura | 370/212 |
| 4,897,854 A | * | 1/1990 | Harris et al. | 375/286 |
| 5,052,037 A | * | 9/1991 | Perelman | 348/14.12 |
| 5,418,526 A | * | 5/1995 | Crawford | 370/464 |
| 5,436,897 A | | 7/1995 | Cook | 370/212 |
| 6,467,065 B1 | * | 10/2002 | Mendez et al. | 714/800 |

FOREIGN PATENT DOCUMENTS

| EP | 0 778 179 | 2/2004 |
| WO | WO 98/05139 | 2/1998 |

* cited by examiner

Primary Examiner—Khai Tran
Assistant Examiner—Edith Chang
(74) Attorney, Agent, or Firm—Kenyon & Kenyon LLP

(57) ABSTRACT

A method, a device, and an interface for transmitting data between at least two subscribers, at least one first subscriber transmitting a pulse-width-modulated data signal. The at least second subscriber for its part transmits an asynchronous data signal, which is composed of binary signals, both subscribers transmitting the data, in each case, at a different, specifiable transmission rate. In this context, one of the two transmission rates, in particular that of the second subscriber, is adjusted, in particular increased, so that the pulse-width-modulated data signal of the first subscriber is simulated by a number of the binary signals of the asynchronous data signal.

11 Claims, 5 Drawing Sheets

FIG. 5

| PWM   |   |   |   |   |   |   |   |   |
|-------|---|---|---|---|---|---|---|---|
| sync  | X | 1 | 1 | 1 | 1 | 1 | 1 | 1 |
| low   | 0 | 0 | X | X | 1 | 1 | 1 | 1 |
| high  | 0 | 0 | 0 | 0 | 0 | X | X | X |
|       | 0 | 1 | 2 | 3 | 4 | 5 | 6 | 7 |

METHOD, DEVICE, AND INTERFACE FOR TRANSMITTING DATA

FIELD OF THE INVENTION

The present invention relates to a device, a method, and an interface for transmitting data between at least two subscribers, at least one first subscriber transmitting a pulse-width-modulated data signal.

BACKGROUND INFORMATION

The transmission of data in the form of a pulse-width-modulated signal is described in PCT Publication No. WO 98/05139. In one specific embodiment of synchronized data transmission, two different information pulses and a synchronization pulse are generated using different pulse lengths. In this manner, as a result of the three different states within the context of one pulse-width modulation, both data information as well as synchronization information can be transmitted. In this context, the use of this method, cited in the related art, and the use of the corresponding interface for data transmission is represented in the aforementioned document, in particular, as applied in a motor vehicle, for example, in the connection between a voltage regulator and the electrical system of a motor vehicle, or as the connection between the voltage regulator and the microcomputer of the digital engine electronics as a component of the control unit.

In addition to a multiplicity of other application possibilities, such as in machine tools, i.e., in the area of producer goods, or in the area of commodity goods, it is precisely in the automobile area that, as a result of the continued expansion of electronic systems and their cross-linking, the necessity is increasingly evident of replacing conventional wiring by bus systems and sub-bus systems.

In this context, in particular, as a central main bus system, a CAN bus, for example, is used, to which, in the automobile area, e.g., for the closing system or an electronic window lift system, etc., a sub-bus system is coupled, especially via a gateway.

Sub-bus systems of this type are robust and simple local bus systems, usually having low transmission rates, generally being subordinated to a main bus system such as CAN. Sub-bus systems of this type are generally configured as master-slave systems, the subscriber, or nodes, that carry out the master function frequently possessing the gateway to the superordinate main bus system. Known sub-bus systems in his connection are the BSS system (bit-synchronous interface) and the LIN bus system (local interconnect network). In the case of sub-bus systems such as LIN or BSS, different sub-bus protocols are generally used. This means that the systems use the same physical layer but different data bit codings. Thus in the case of the LIN bus system, a standard NRZ coding (not return to zero) is used, whereas in a BSS bus a phase modeling, specifically a pulse-width modeling, is used as the coding.

Heretofore, sub-bus systems of this type, especially the two aforementioned, have been so different that they cannot communicate when mixed. For the hardware of systems of this type, this results in the fact that either a variant must be selected or the costs for implementation sharply increase. Furthermore, as a result, the flexibility of changing from one to another bus system, or bus protocol, is sharply limited. Thus, heretofore, only special, very expensive electronic circuits, or components, and very expensive software implementations have been capable of imaging a sub-bus protocol, for example using pulse-width-modulated data coding, onto another sub-bus protocol, or onto another sub-bus controller, for example, using asynchronous, binary data coding.

Thus the objective comes about to realize, using a simple arrangement, this type of mixed communication between different bus, especially sub-bus systems.

SUMMARY OF THE INVENTION

This objective is achieved by a method, a device, and an interface for transmitting data between at least two subscribers, at least one first subscriber transmitting a pulse-width-modulated data signal and the at least second subscriber transmitting an asynchronous data signal which is composed of binary signals. In this context, both subscribers transmit the data in each case at a different, specifiable transmission rate. Advantageously, at least one of the two transmission rates, in particular that of the second subscriber, is adjusted, in particular increased, such that the pulse-width-modulated data signal of the first subscriber is simulated by a number of binary signals of the asynchronous data signal.

In this manner, in an advantageous way, a bit-synchronous data stream, especially in the context of the BSS bus system, can be generated using a standard controller component, for example, a UART component (Universal Asynchronous Receiver/Transmitter). It is also advantageous that, for example, an SCI protocol (Scalable Coherent Interface IEEE Standard 1596 in 1992) can be converted, so that a system, for example, designed for the LIN bus, can be integrated into a pulse-width-modulated bus system, for example, BSS, without modifying the hardware.

Thus, in an advantageous manner, the mixed communication of different bus systems, specifically sub-bus systems such as LIN or BSS, is possible using a simple arrangement. Advantageously, the pulse-width-modulated data signal of the first subscriber in one time segment is simulated by a number of binary signals of the asynchronous data signal, the time segment being stipulated and/or determined as a function of the transmission rate of the first subscriber.

Advantageously, the number of binary signals by which the pulse-width-modulated data signal is simulated is stipulated and/or determined as a function of the transmission rate of the asynchronous data signal.

Also advantageous is the fact that at least the transmission rate of the asynchronous data signal of the at least second subscriber can be variably stipulated such that the number of binary signals per time segment can be adjusted, it being possible to determine the time segment from the transmission rate of the pulse-width-modulated data signal.

Furthermore, it is expedient that in one special embodiment the data of the asynchronous data signal are transmitted in data groups made of binary signals having one start binary signal, at least one stop binary signal, and at least one data binary signal transmitted between the start binary signal and the stop binary signal, as is the case, for example, in a UART controller.

In one specific embodiment, specifically BSS, the data are transmitted as synchronized by the pulse-width-modulated data signal such that at the beginning of the data transmission at least one synchronization signal is transmitted.

With reference to the specific embodiments, this means that at a data rate that is raised repeatedly, with regard to the SCI protocol, i.e., for example the LIN bus, in comparison to the known data rates on the BSS bus, a communication is possible on the two different bus systems. Advantageously, via specific data patterns in the data byte of an asynchronous component, for example a UART controller, the phases in the bit timing of the BSS protocol are simulated and are reconstructed upon reception.

BRIEF DESCRIPTION OF THE DRAWINGS

FIG. 5 once again depicts the connection of the pulse-width-modulated data signal having in each case an asynchronous data word and a blur arising therein in the context of tolerances within the data signals.

DETAILED DESCRIPTION

In what follows, for a pulse-width-modulated data signal according to the present invention, a BSS data stream as well as the corresponding protocol are described, and for the asynchronous data signal, an LIN data stream as well as the corresponding protocol, or accordingly a standard UART controller, are described. These concrete examples are used in the context of the exemplary embodiment, but they do not limit the subject matter according to the present invention, with reference to a pulse-width-modulated protocol as well as to an asynchronous protocol.

Figure 1:
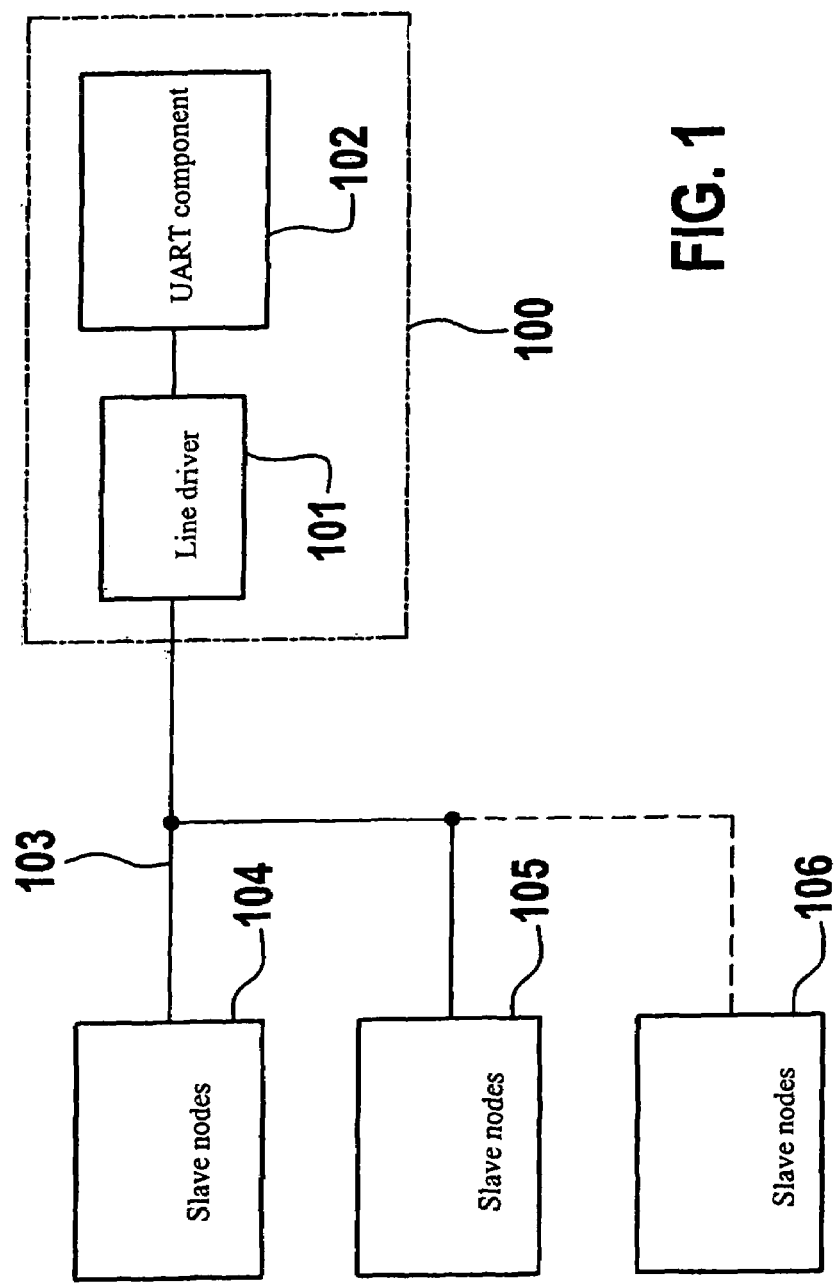
FIG. 1 depicts a bus, specifically a sub-bus system, in which the master function is carried out by an asynchronous network node, specifically an LIN master system, further, specifically BSS slave nodes being linked via the bus system.
Figure 2:
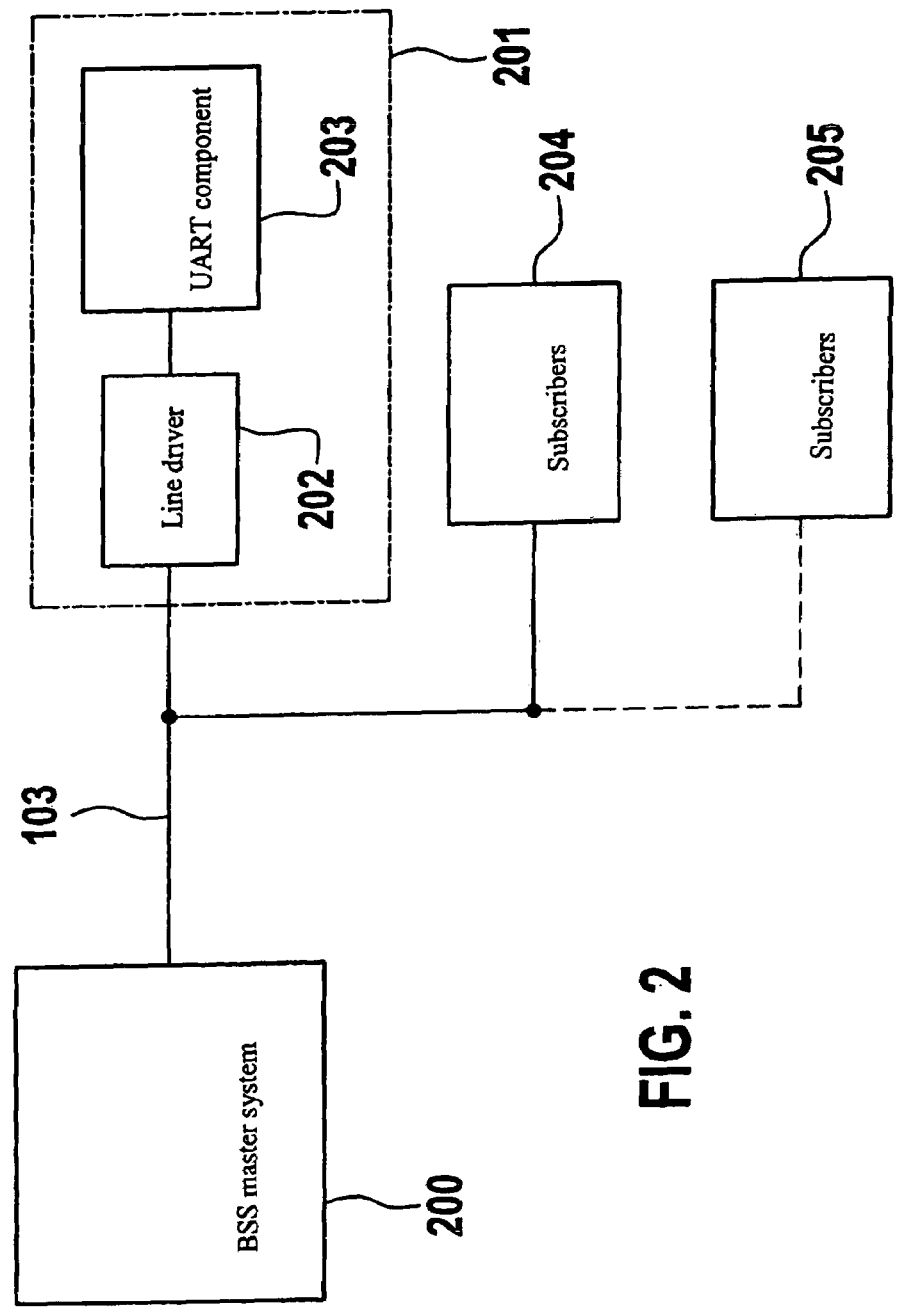
FIG. 2 depicts a further bus, specifically a sub-bus system, in which the master function is carried out by a subscriber that carries out pulse-width-modulated data transmission, specifically in a BSS master system. To the latter, via a bus system, an asynchronous slave system, specifically an LIN slave system, is connected, along with further nodes.

FIG. 1 depicts a bus system 103, which, as a line system or as a line, presents the basis for the physical layer of an OSI layer model, but which is not part of the physical layer. Connected thereto at 104 and 105 are slave nodes, specifically BSS slave nodes. These slave nodes can be integrated in actuators, sensors, or the like, or they can be coupled to bus system 103. Optionally, further subscribers or nodes 106, for example gateways to further sub-bus systems, can be connected. The master function in FIG. 1 is realized, for example, by an LIN master system 100 having a line driver 101 as well as a controller and UART component 102. In this context, controller 102 can also function as an interface, in accordance with the present invention, of the BSS system to an LIN bus system.

A sub-bus system of the type depicted in FIG. 1 predominantly acts to cross-link actuators and sensors in one small area, for example, within a car door. Systems of this type are frequently designed as master-slave systems, the sub-bus master usually also having available to it a further interface to the main system bus, for example, a CAN or a TTP bus, for connecting to the global network. On the other hand, the sub-bus master can also be a part of a control unit, in particular for controlling operational sequences in a motor vehicle.

To reduce the customary networking costs, the aforementioned sub-bus systems are used in place of customary cabling or wiring. Line 103 functions as the basis for the bit-transmission layer, the so-called physical layer corresponding to the OSI layer model, but it itself is not a component of this layer. The bit transmission layer is the electrical or functional interface to the physical transmission medium, in this case to the line.

Instead of an LIN master system, as in FIG. 1, a BSS master system can also be present. In this context, BSS master 200, for example, maintains an interface or gateway to the main bus system, such as CAN, and at the same time a connection to bus system 103. Connected to the latter via 201 is an LIN slave system. The latter for its part contains a line driver 202 as well as a controller and UART component 203. Further sub-bus systems and sensors or actuators can also be connected to the LIN slave system as well as to the LIN master system via interfaces, for example, of the controller or of UART, here, too, at least parts, such as the controller or UART of the LIN slave system, being able to be used as the interface according to the present invention for the mixed communication of an LIN system with a BSS system.

At 204, further subscribers, for example as BSS nodes or LIN slave systems, are connected to bus system 103. Here, too, slave systems, or nodes, as subscribers can be integrated in the specific elements to be connected, especially actuators and sensors, or they can be connected to the bus system in other ways. Optionally, further subscribers 205 can be connected to the bus system; similarly further sub-bus systems can be connected by a gateway.

The information to be transmitted or the data to be transmitted of the BSS protocol, as was already stated, are represented in pulse-width-modulated form. A depiction of this type is disclosed in FIG. 3. There, by way of example, in a voltage-time diagram, specific voltage level U1, or U2, is depicted over time t. In this context, low-level U1, or zero ("0") level, is, for example, ground GND, and high-level, or one ("1") signal U2, corresponds, for example, to a supply voltage, in particular to battery voltage $U_{bat}$.

Represented by 300 is the signal characteristic of a first state, of the synchronization information, or of synchronization signal sync. In this context, the synchronous time interval for low-level $T_{sync}$ is, for example, ⅛ of total cycle duration $T_{per}$. This total cycle duration for the pulse-width-modulated signal can be set by stipulating the transmission rate.

Indicated characteristic 301 of the data signal corresponds to a low signal information message having a zero or low signal time interval $T_{low}$. In this context, $T_{low}$ is, for example, ⅜ of the total cycle duration. Using this pulse length, it is possible to represent, for example, the zero or low information message.

The third state to be depicted is the high or one-signal information message, which is indicated by signal characteristic 302. In this context, $T_{high}$ or the high signal time interval is, for example, ⅝ of total cycle duration $T_{per}$. Every other subdivision of the individual pulse width for the three states can also be used. Thus, here, by way of example, three states can be represented by the signal characteristics 300, 301, and 302, which are used to realize a synchronization information message, a low-signal information message, or a high-signal information message. In this way, any data can be transmitted in synchronized form.

Pulse-width-modulated data signals of this type are used, for example, in the context of the BSS protocol. In this context, periodic sync pulse sync comes from the master system. All slaves or slave systems, in this context, synchronize to the falling or low edge.

Figure 3:
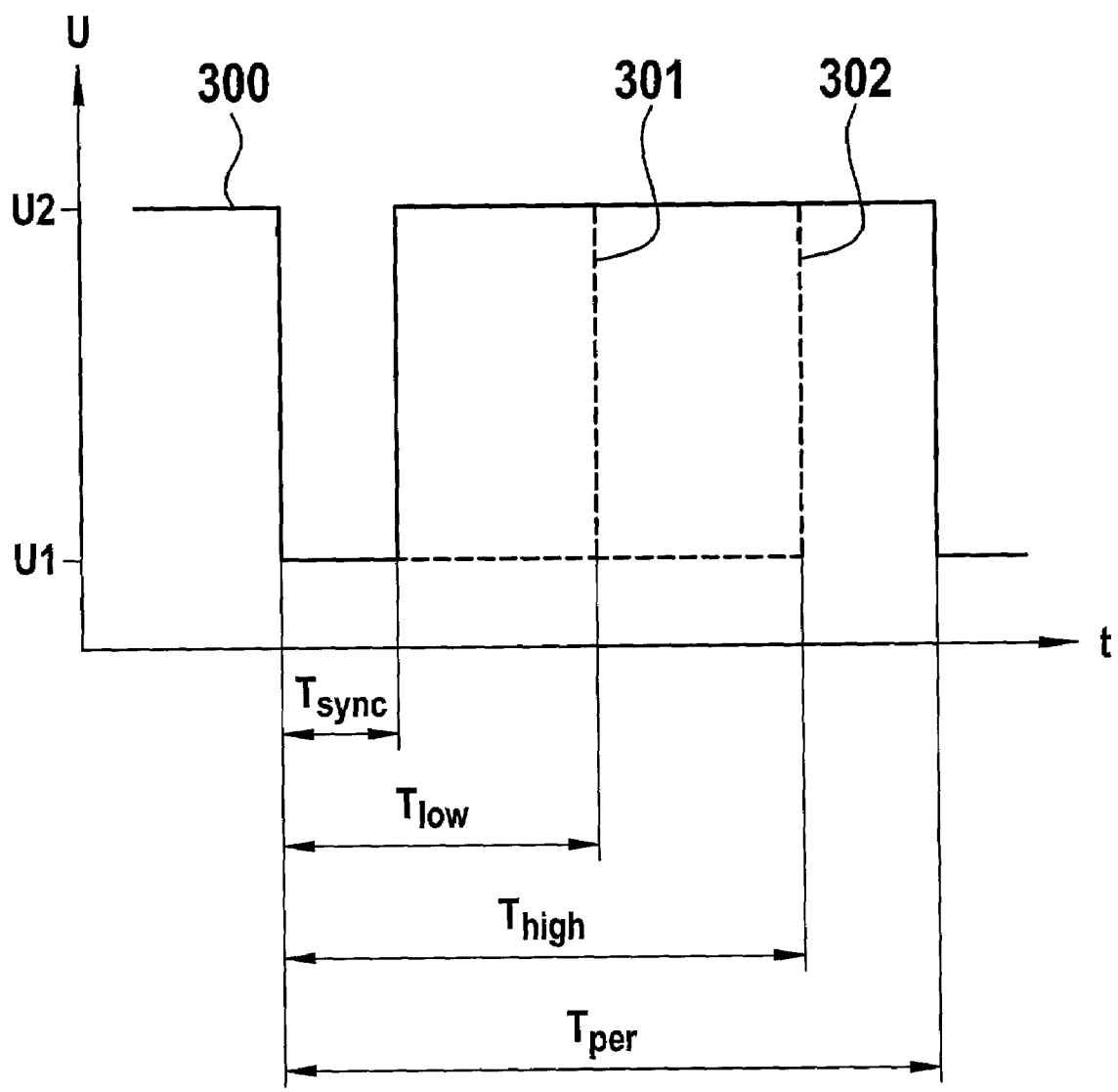
FIG. 3, by way of example, depicts the signal characteristic of a pulse-width-modulated data signal.
Figure 4:
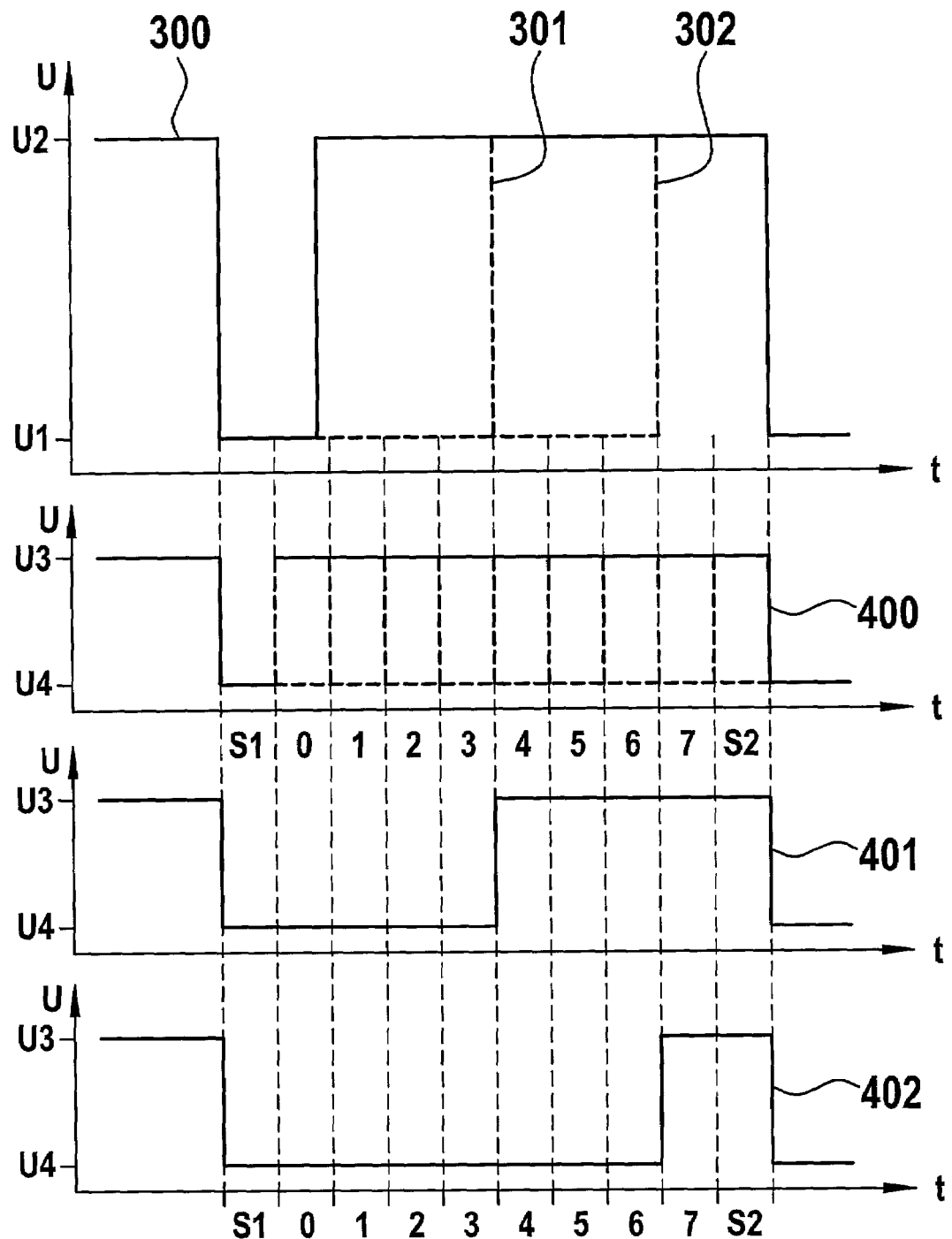
FIG. 4 depicts the data coding of an asynchronous data signal as well as the imaging of the pulse-width-modulated data signal by the asynchronous data signal.

In FIG. 4, the pulse-width-modulated depiction described in FIG. 3 is once again represented. This means, for example, in a BSS protocol, the data information message is coded into the pulse width of one periodic signal. To simulate this information message using, for example, an NRZ-coded data stream having binary signals, the transmission rate in the NRZ data stream is now increased (the same, of course, applies also to an RZ data stream). I.e., to represent the BSS bit timing, a plurality of data bits is used in the NRZ data stream.

In 400, an NRZ-coded data signal characteristic of this type is depicted so as to be preferably asynchronous. In this example, total cycle duration $T_{per}$ from FIG. 3 is simulated using 8 (data) binary signals, or data bits, as well as one start binary signal, or start bit S1, and one-stop bit S2. In this context, every other data bit number, with or without start or stop bit, can be used as the number of binary signals, as a function of the transmission rate. Thus, for example, a simulation is possible that also uses 4 data bits in place of 8 data bits or 10 bits. If the transmission rate of the LIN system, or of the UART controller, is selected so that, for example, one byte plus start and stop bit includes two cycle time durations $T_{per}$, i.e., that two cycle time durations can be simulated using a total of 10 bits, then two BSS-coded information messages, beginning at start bit S1 and terminating at stop bit S2, can be simulated. In this context, a high level of the simulating system is depicted at U3, and a low level of the same at U4. These levels can be selected as desired, or be system-immanent, and they can also correspond to levels U1 or U2, respectively.

Commencing with start bit S1, the following byte, i.e., the data bits 0 through 7, can be set as binary signals as desired, to simulate the data signal in accordance with signal characteristics 300, 301, or 302. If, for example, the data signal characteristic according to 301 is simulated, then, as is depicted in signal characteristic 401, the start bit and the first four data bits are set at the low level, i.e., at level U4. Thus signal characteristic 301 can be simulated in the context of specific tolerances in the bit timing. This is also possible with respect to signal characteristic 302 using signal characteristic 402, in which, in addition to the start bit, for example, the first 6 bits are transmitted at a low level. Similarly, the synchronization signal is indicated, e.g., at S1, at an equally low level.

As can be seen here, as a result of the choice of the transmission rate of the pulse-width-modulated signal, i.e., of cycle duration $T_{per}$ of the latter, and as a result of the choice of the transmission rate of the simulating data signal, the resolution of the bit simulation can be set as desired.

Since, for example, a BSS node in accordance with the BSS specification, can have a transmitting tolerance of +/−3% of the typical value, the pulse-width-modulated signal can generally be simulated only approximately, in particular using the preestablished subdivision of the start, data, and stop bits. In addition, certain imprecisions are conceivable if the transmission rates of the two data streams cannot be converted one to the other in precise whole numbers.

Since, in addition, both the transmission as well as the receiving tolerances in pulse-width-modulated data signals, especially related to the BSS specification, permit temporal deviations of the edge change, it is important to distinguish whether, on the one hand, the data transmitted by the asynchronous interface, in particular the UART, can be read by a BSS node, or whether, on the other hand, the pulse-width-modulated signals of a BSS node can be correctly detected and interpreted at a microcontroller, UART.

FIG. 5 depicts an assignment of this type of pulse-width-modulated signal, in each case, to an asynchronous data word. In the table, start and stop bits are ignored because they can be detected clearly. The ambiguity of the data bits is caused by the different possible time points of the edge change in the context of the tolerance, as well as by the type of bit detection of the UART using oversampling, and this ambiguity is designated by "X."

If, as is the case here, only 1/10 of cycle duration $T_{per}$ is used as a subdivision for representing the pulse-width-modulated signals, nevertheless an unambiguous distinction can take place. Thus synchronization signal sync and low signal low can clearly be distinguished using data bit 1. Similarly, the low and high signal high, in this example, can be clearly distinguished using data bit 4. This means that even bad asynchronous controllers, in particular UARTs, which do not perform, for example, any rejections of the scanning values lying in the edge range of the signals, can be used even without forming an average value of the non-rejected signals.

Conversely, for the reception of a synchronous pulse at the UART, the possibility results of using in binary representation 01111111 (data bits 0–7) or 11111111 in hexadecimal representation FF and FE. A 0 or low information message can be represented using FC, F8, and F0 (hexadecimal). The 1 or high information message, with reference to this example, can be depicted using E0, C0, 80 and 00 (hexadecimal). Thus, despite different subdivisions of BSS pulses and UART bits, the pulses can be both received as well as transmitted by the asynchronous interface.

Using the present invention, there is therefore in principle the possibility of having sub-bus systems, or sub-bus components having pulse-width-modulated data signals and sub-bus systems and sub-bus components having asynchronous, especially NRZ-coded data signals, communicate in mixed form, this being possible, especially in BSS and LIN, on the same hardware. In this way, sub-bus protocols of this type, or the corresponding data signals, can be used as required in the identical hardware configuration or can be exchanged one for the other.

In this context, at least one of the two transmission rates, in particular data of the asynchronous data stream, i.e., of the UART, or LIN system, is adjusted, in particular increased, so that the pulse-width-modulated signal can be simulated by a number of binary signals. For this purpose, a reduction (or increase) of the transmission rate of the pulse-width-modulated signal is just as conceivable as an increase (or reduction) of the transmission rate of the asynchronous, in particular NRZ data stream.

What is claimed is:

1. A method for transmitting data between at least two subscribers, comprising the steps of:

causing at least a first one of the at least two subscribers to transmit a pulse-width-modulated data signal at a first specifiable transmission rate;

causing at least a second one of the at least two subscribers to transmit at a second specifiable transmission rate an asynchronous data signal that includes binary signals, wherein:

the first specifiable transmission rate and the second specifiable transmission rate are different from each other; and adjusting one of the first specifiable transmission rate and the second specifiable transmission rate such that the pulse-width-modulated data signal is simulated by a number of the binary signals of the asynchronous data signal, wherein:

the pulse-width modulated signal includes three characteristics that represent three states, a first state corresponding to a synchronization information, a second state corresponding to a low-signal information, and a third state corresponding to a high-signal information.

2. The method according to claim 1, wherein:
the step of adjusting includes increasing the second specifiable transmission rate.

3. The method according to claim 1, further comprising the steps of:
simulating the pulse-width-modulated data signal in one time segment by the number of the binary signals of the asynchronous data signal; and
at least one of stipulating and determining the asynchronous data signal as a function of the first specifiable transmission rate.

4. The method according to claim 1, further comprising the step of:
at least one of stipulating and determining the number of the binary signals that simulate the pulse-width-modulated data signal as a function of the second specifiable transmission rate.

5. The method according to claim 1, further comprising the step of:
variably stipulating at least the second specifiable transmission rate such that, as a result, the number of the binary signals per time segment, which can be determined from the first specifiable transmission rate, can be set.

6. The method according to claim 1, further comprising the step of:
transmitting data of the asynchronous data signal in data groups made of the binary signals including a start binary signal, at least one stop binary signal, and at least one data binary signal transmitted between the start binary signal and the at least one stop binary signal.

7. The method according to claim 1, wherein:
data are transmitted in synchronized form by the pulse-width-modulated data signal such that at a beginning of a data transmission at least one synchronization signal is transmitted.

8. A device for transmitting data, comprising:
at least a first subscriber transmitting a pulse-width-modulated signal at a first specifiable transmission rate;
at least a second subscriber transmitting an asynchronous data signal including binary signals at a second specifiable transmission rate;
a connection for performing a data transmission; and
an arrangement for adjusting at least one of the first specifiable transmission rate and the second specifiable transmission rate in order to simulate the pulse-width-modulated data signal by a number of the binary signals of the asynchronous data signal, wherein:
the pulse-width modulated signal includes three characteristics that represent three states, a first state corresponding to a synchronization information, a second state corresponding to a low-signal information, and a third state corresponding to a high-signal information.

9. The device according to claim 8, wherein:
the arrangement for adjusting increases the second specifiable transmission rate.

10. An interface for transmitting data between at least a first subscriber and at least a second subscriber, the at least first subscriber transmitting a pulse-width-modulated data signal at a first specifiable transmission rate, and the at least second subscriber transmitting at a second specifiable transmission rate an asynchronous data signal that includes binary signals, the interface comprising:
an arrangement for adjusting one of the first specifiable transmission rate and the second specifiable transmission rate in order to simulate the pulse-width-modulated data signal by a number of the binary signals of the asynchronous data signal, wherein:
the pulse-width modulated signal includes three characteristics that represent three states, a first state corresponding to a synchronization information, a second state corresponding to a low-signal information, and a third state corresponding to a high-signal information.

11. The interface according to claim 10, wherein:
the arrangement for adjusting increases the second specifiable transmission rate.

* * * * *